United States Patent [19]

Ogawa et al.

[11] Patent Number: 4,662,331

[45] Date of Patent: May 5, 1987

[54] PRECOMBUSTION CHAMBER CONSTRUCTION OF INTERNAL COMBUSTION ENGINE

[75] Inventors: Yutaka Ogawa; Takayuki Ogasawara; Shigeru Hanzawa, all of Nagoya, Japan

[73] Assignee: NGK Insulators, Ltd., Japan

[21] Appl. No.: 786,646

[22] Filed: Oct. 10, 1985

[30] Foreign Application Priority Data

Oct. 17, 1984 [JP] Japan ............. 59-155665[U]

[51] Int. Cl.⁴ .................................. F02B 75/98
[52] U.S. Cl. .................................. 123/270; 123/669
[58] Field of Search .................. 123/270–272, 123/668, 669

[56] References Cited

U.S. PATENT DOCUMENTS 3,820,523  6/1974  Showalter et al. ............ 123/669
4,004,563  1/1977  Makamura et al. ............ 123/271
4,426,966  1/1984  Huther et al. ................. 123/270

FOREIGN PATENT DOCUMENTS 1526290  4/1970  Fed. Rep. of Germany .
1276835 10/1961  France ......................... 123/270
162721   9/1983  Japan .......................... 123/270

Primary Examiner—Craig R. Feinberg
Attorney, Agent, or Firm—Parkhurst & Oliff

[57] ABSTRACT

A precombustion chamber construction of an internal combustion engine includes an upper ceramic body and a lower ceramic body abutting thereagainst to form a precombustion chamber communicating through an injection hole with a main combustion chamber. According to the invention at least a portion of abutting surfaces of the upper and lower ceramic bodies is inclined relative to a plane perpendicular to a longitudinal axis of the precombustion chamber, thereby preventing any relative rotative movement of the upper and lower ceramic bodies even if they are subjected to rotating forces caused by vibrations of the engine or explosion of fuel.

5 Claims, 5 Drawing Figures

FIG_2a
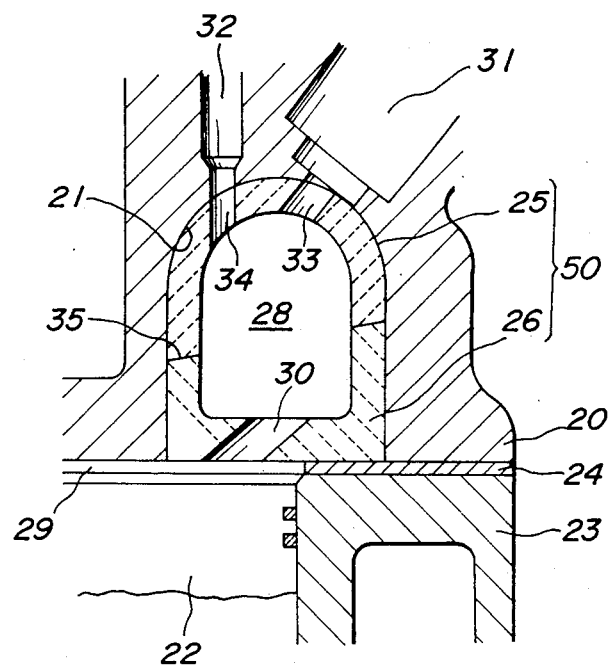
FIG_2b
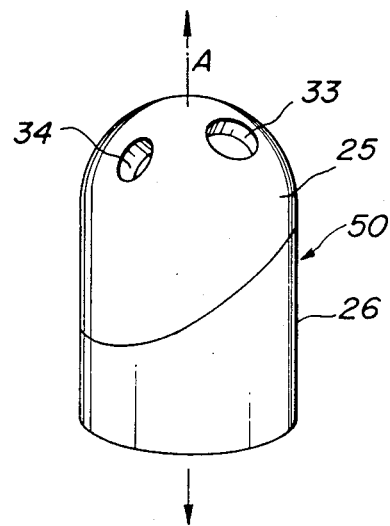

FIG_3
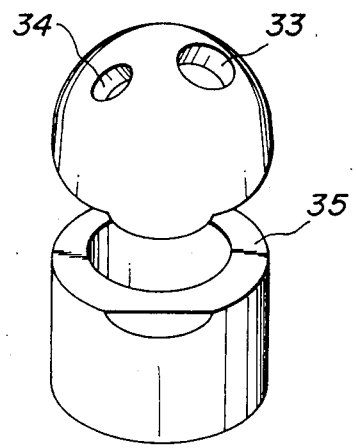
FIG_4
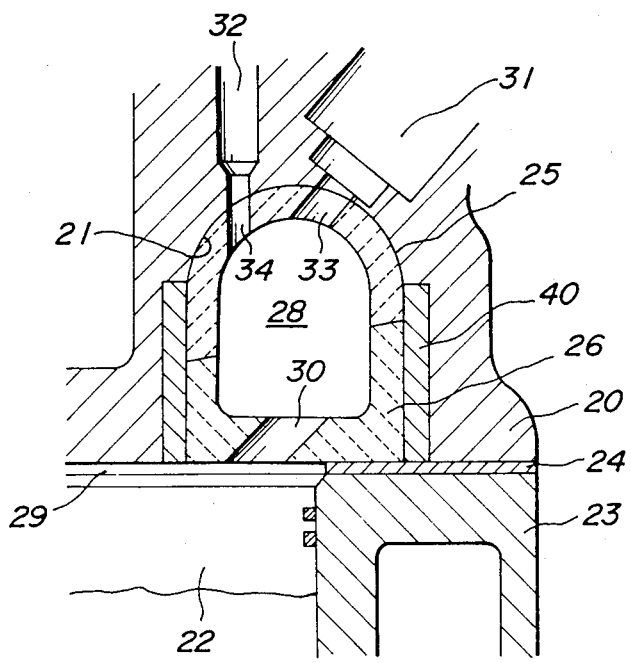

PRECOMBUSTION CHAMBER CONSTRUCTION OF INTERNAL COMBUSTION ENGINE

BACKGROUND OF THE INVENTION

This invention relates to a precombustion chamber construction of an internal combustion engine and more particularly to a precombustion chamber made of a ceramic material to improve the thermal efficiency of an engine and durability and heat-resistance of the precombustion chamber.

In order to improve the thermal efficiency of engines, particular characteristics of exhaust gases and the durability of precombustion chambers of internal combustion engines, particularly diesel engines, various attempts have been made to form part or all of turbulence chambers of internal combustion engines from ceramic materials, thereby utilizing their superior characteristics such as heat-resistance and thermal insulating capability.

However, because ceramic materials have thermal expansion coefficients which are smaller than those of materials constituting cylinder heads, for example, cast irons or aluminum alloys, supporting forces of the cylinder heads for the precombustion chambers tend to decrease when the cylinder heads are at high temperatures. With a precombustion chamber construction of a ceramic material consisting of upper and lower members, particularly, there is a tendency of the members to rotate relative to each other, so that an injection hole for communicating a main chamber with the precombustion chamber moves from its proper position to disturb normal ignition and explosion of a fuel. Moreover, when the upper and lower members rotate relative to each other to an extreme extent, a fuel injection nozzle and a glow-plug may be damaged by the movement.

To avoid the above undesirable effects Japanese Laid-open Utility Model Application No. 58-79,019, as shown in FIG. 1 herein, a precombustion chamber 10 is made in a two-split construction comprising an upper member 3 and a lower member 4, between which are inserted an annular gasket 6 and a thermal insulating spacer 7 made of heat-resistant metals so as to urge in their axial directions toward each other with the aid of an elastic force of the annular gasket 6, thereby forming a unitary body.

With this arrangement, however, the relative rotative movement of the upper and lower members 3 and 4 is prevented only by frictional forces between the annular gasket 6 and end faces of the upper and lower members 3 and 4. Accordingly, this arrangement does not solve the problem of damage to the fuel injection nozzle and glow-plugs sufficiently. Moreover, the requirement that the annular gasket and the thermal insulating spacer separate from the upper and lower members increases the numbers of parts, thereby making difficult the management of products and increasing the cost of the products.

SUMMARY OF THE INVENTION

It is a primary object of the invention to provide a precombustion chamber construction for an internal combustion engine, which eliminates the above disadvantages of the prior art and comprises upper and lower ceramic bodies forming a precombustion chamber, which do not rotate relative to each other.

In order to achieve this object, in a precombustion chamber construction of an internal combustion engine, consisting of an upper ceramic body and a lower ceramic body abutting thereagainst (i.e., contacting each other along an interface) to form a precombustion chamber communicating through an injection hole with a main combustion chamber, according to the invention, at least a portion of the interface between said upper and lower ceramic bodies is inclined relative to a plane perpendicular to a longitudinal axis of said precombustion chamber.

With this arrangement of the abutting surfaces at least partially inclined relative to the plane perpendicular to the longitudinal axis of the ceramic bodies, any rotative movement of the ceramic bodies about the axis is securely prevented even if both of the ceramic bodies are subjected to rotating forces caused by explosion of fuel and vibrations of the engine.

In a preferred embodiment of the invention, the upper and lower ceramic bodies are provided on their outer circumferential surfaces with a metal ring enclosing the abutting surfaces.

The invention will be more fully understood by referring to the following detailed specification and claims taken in connection with the appended drawings.

BRIEF DESCRIPTION OF THE DRAWINGS

FIG. 2a is a sectional view of a precombustion chamber construction of one embodiment of the invention;

FIG. 2b is a perspective view of upper and lower ceramic bodies of the precombustion chamber construction shown in FIG. 2a;

FIG. 3 is a perspective view of two ceramic bodies of another embodiment of the invention; and FIG. 4 is a sectional view of a precombustion chamber construction of a further embodiment of the invention.

DESCRIPTION OF THE PREFERRED EMBODIMENT

Figure 1:
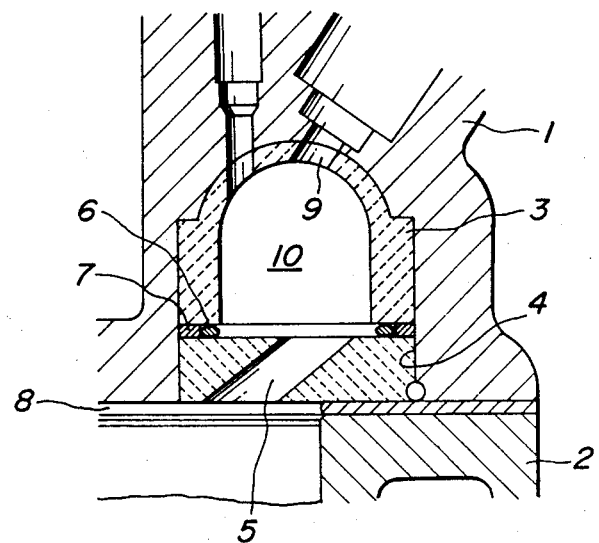
FIG. 1 is a sectional view of a precombustion chamber construction of the prior art.

FIG. 2a illustrates a precombustion chamber structure 50, according to the invention, which is inserted in a precombustion chamber receiving hole 21 formed in a cylinder head 20. The cylinder head 20 is attached through a gasket 24 to a cylinder block 23 having a piston 22 therein. The precombustion chamber structure 50 is formed by an upper ceramic body 25 and a lower ceramic body 26 abutting thereagainst to form a precombustion chamber 28. The precombustion chamber 28 communicates through an injection aperture 30 with a main combustion chamber 29. The cylinder head 20 is formed with a fuel injection nozzle receiving portion 31 and a glow-plug receiving portion 32, respectively, which communicate through apertures 33 and 34 with the precombustion chamber 28, respectively. Thus, according to the invention, all wall surfaces of the precombustion chamber, on which gases of combustion contact, except the apertures 33 and 34, are made of ceramic material, so that the thermal insulating capability is remarkably improved in comparison with precombustion chamber constructions of the prior art.

As can be seen from FIG. 2b, the precombustion chamber construction according to the invention comprises upper and lower ceramic bodies 25 and 26 having abutting surfaces 35 which are inclined at a certain angle relative to a plane vertical to a longitudinal axis A of the precombustion chamber. The upper and lower ceramic bodies 25 and 26 are held in position in the precombustion chamber receiving hole 21 formed in the cylinder head 20 without any relative rotative movement. Moreover, the upper and lower ceramic bodies are easily inserted into the precombustion chamber receiving hole 21 by previously joining them with an adhesive such as an organic adhesive prior to the insertion of them.

In this case, the upper and lower ceramic bodies are made of silicon nitride, silicon carbide, zirconia, alumina, glass ceramics, mullite or the like.

FIG. 3 illustrates another embodiment of the invention which is different from the embodiment shown in FIGS. 2a and 2b, wherein only a portion of abutting surfaces 35 (i.e., the interface 35) of upper and lower ceramic bodies, is inclined relative to a plane vertical to a longitudinal axis A of the precombustion chamber. In this manner, the abutting surfaces, having partially inclined portions, function to prevent a relative rotative movement of the ceramic bodies, while the abutting surfaces serve as positioning means for them. In this embodiment, the abutting surfaces are formed, in their entirety, perpendicular to the longitudinal axis of the precombustion chamber. The lower ceramic body is formed at an edge of the abutting surface with an oblique surface inclined relative to the plane perpendicular to the longitudinal axis of the precombustion chamber. Also, the upper ceramic body is formed with a protrusion complementary to the oblique surface of the lower ceramic body to form a cylindrical body devoid of any protrusion when the upper and lower ceramic bodies are assembled.

FIG. 4 illustrates a further embodiment of the invention, wherein upper and lower ceramic bodies 25 and 26 having inclined abutting surfaces are provided with a cylindrical metal ring 40 fitted thereon. The metal ring 40 is so dimensioned that it completely covers an outer circumferential surface of the lower ceramic body 26 and a part of the upper ceramic body 25 so as to enclose the abutting surfaces 35 of both of the ceramic bodies. In this manner, the outer cylindrical circumferential surfaces and the abutting surfaces 35 are covered by the metal ring, so that the ceramic bodies are completely prevented from being damaged in mounting the precombustion chamber construction into a cylinder head 20. Various types of metals can be applied to the ring 40. In consideration of use condition, however, a heat-resistant metal is preferably used, for example, a nickel-chromium steel, such as SUS 304, SUS 309, SUS 316, SUS 405, SUS 410, SUH 310, SUH 616 and SUH 661 (Japanese Industrial Standard).

As can be seen from the above description, the precombustion chamber construction according to the invention comprising upper and lower ceramic bodies whose abutting surfaces are at least partially inclined, relative to a plane perpendicular to a longitudinal axial direction of the precombustion chamber, can prevent any relative rotative movement of the upper and lower ceramic bodies without using particular engaging means such as pins, and thereby facilitate positioning of the upper and lower ceramic bodies. The precombustion chamber construction according to the invention is very effective to contribute to the development of industry.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A precombustion chamber for an internal combustion engine, comprising an upper ceramic body and a lower ceramic body which contact each other along an interface to form a precombustion chamber having an interior, said precombustion chamber communicating with a main combustion chamber through an injection hole, wherein at least a portion of said interface between said upper and lower ceramic bodies is inclined relative to a plane perpendicular to a longitudinal axis of the interior of said precombustion chamber, said main combustion chamber having a longitudinal axis parallel to the longitudinal axis of said precombustion chamber.

2. A precombustion chamber construction as set forth in claim 1, wherein substantially all of the interface between said upper and lower ceramic bodies is inclined relative to said plane perpendicular to the longitudinal axis of the precombustion chamber.

3. A precombustion chamber construction as set forth in claim 1, wherein said upper and lower ceramic bodies are provided with an annular metal ring along their outer circumferential surfaces, thereby enclosing said interface.

4. A precombustion chamber for an internal combustion engine, comprising an upper ceramic body having a substantially flat contact surface and a lower ceramic body having a complementary substantially flat contact surface, said contact surfaces contacting each other along an interface to form a precombustion chamber having an interior, said precombustion chamber communicating with a main combustion chamber through an injection hole, wherein substantially all of said interface is inclined relative to a plane perpendicular to a longitudinal axis of the interior of said precombustion chamber, said main combustion chamber having a longitudinal axis parallel to the longitudinal axis of said precombustion chamber.

5. A precombustion chamber construction as set forth in claim 4, wherein said upper and lower ceramic bodies are provided with an annular metal ring along their outer circumferential surfaces, thereby enclosing said interface.

* * * * *